Sept. 10, 1940.   F. H. McCORMICK   2,214,060
DOMESTIC APPLIANCE
Filed Nov. 30, 1937   2 Sheets-Sheet 1

INVENTOR.
Francis H. McCormick
BY Spencer Hardman and Fehr
ATTORNEYS

Sept. 10, 1940.　　F. H. McCORMICK　　2,214,060
DOMESTIC APPLIANCE
Filed Nov. 30, 1937　　2 Sheets-Sheet 2

INVENTOR.
BY Francis H McCormick
Spencer Hardman and Fehr
ATTORNEYS

Patented Sept. 10, 1940

2,214,060

UNITED STATES PATENT OFFICE 2,214,060

DOMESTIC APPLIANCE

Francis H. McCormick, Dayton, Ohio, assignor to General Motors Corporation, Dayton, Ohio, a corporation of Delaware Application November 30, 1937, Serial No. 177,256

2 Claims. (Cl. 53—5)

This invention relates to domestic appliances and more particularly to broilers located in an oven.

In broiling, it is necessary to provide some means for adjusting the distance of the broiling rack or grid from the heating element. For toasting, broiling bacon and thin steaks, the position should be about 1¼" from the heating element. For thick steaks, fish and broiled chicken, this distance should be about 3". Usually, this adjustment is provided by providing shelf guides upon the oven sides at various heights onto which the broiling pan may be placed. This arrangement is not very satisfactory, since from another standpoint, it is desirable to be able to slide the broiling pan directly onto the open oven door. Where guides upon the side of the oven at various heights are used, it is not possible to make the broiling pan slide directly onto the oven door, except in one position. If the broiling pan is pulled onto the oven door from a higher position, there is danger that hot grease may run out and burn the hand of the person pulling out the pan.

It is, therefore, an object of my invention to provide an oven with a broiling arrangement wherein the broiling pan may be pulled out directly onto the door regardless of the position of the broiling rack with respect to the heating element.

It is another object of my invention to control the distance between the surface of the broiling rack and the heating element by changing the distance between the surface of the broiling rack and the bottom of the broiling pan.

Further objects and advantages of the present invention will be apparent from the following description, reference being had to the accompanying drawings, wherein a preferred form of the present invention is clearly shown.

Briefly, I have shown an electric range with the heating element for broiling purposes located near the floor of the oven. The oven door is pivoted on its lower edge and swings downwardly so that when lowered, its inner face is in alignment with the floor of the oven. The floor of the oven and the inner face of the door are provided with aligned guide-ways for guiding the broiling pan into and out of position beneath the heating element for broiling purposes. The broiling pan supports the rack upon a ledge provided around the rim of the pan. The broiling rack is reversible and in one position rests upon supports which places its upper surface within about 1¼" from the heating element, while when this rack is inverted, the surface of the rack is just above the ledge of the pan and thus makes its surface about 3" below the heating element.

Figure 1:
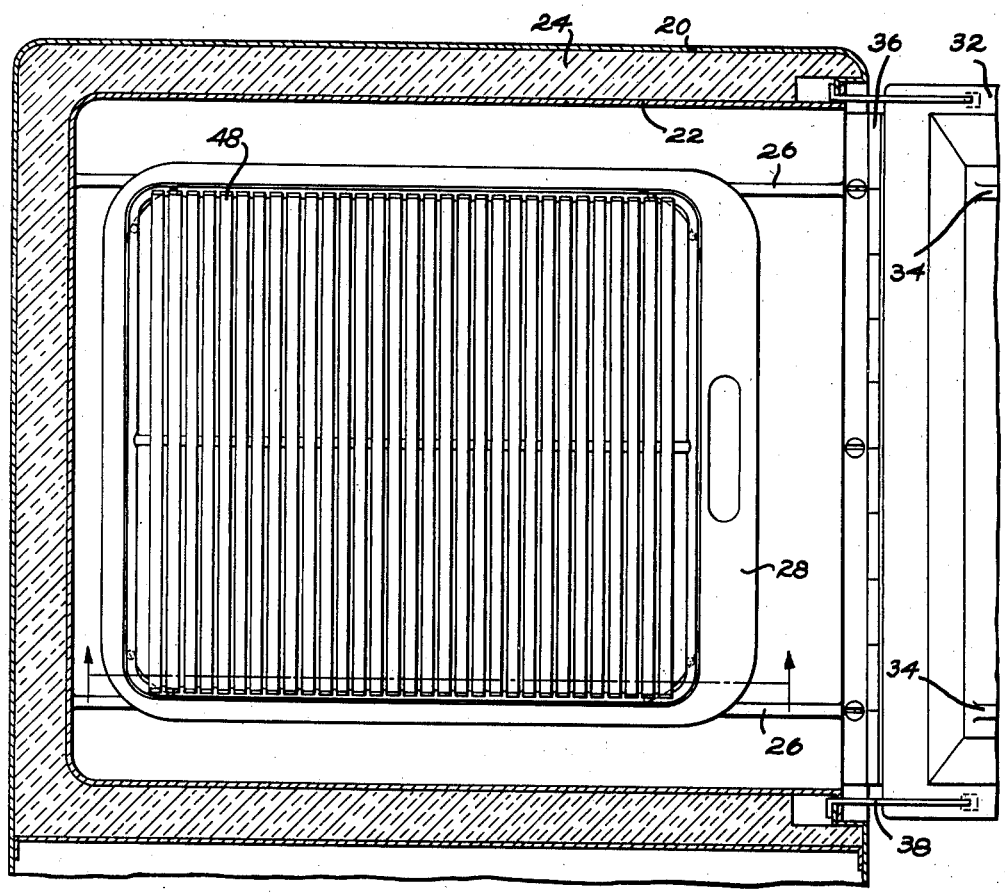
Fig. 1 is a horizontal sectional view through the oven of an electric range looking down upon the broiling rack, pan and guide-way.
Figure 2:
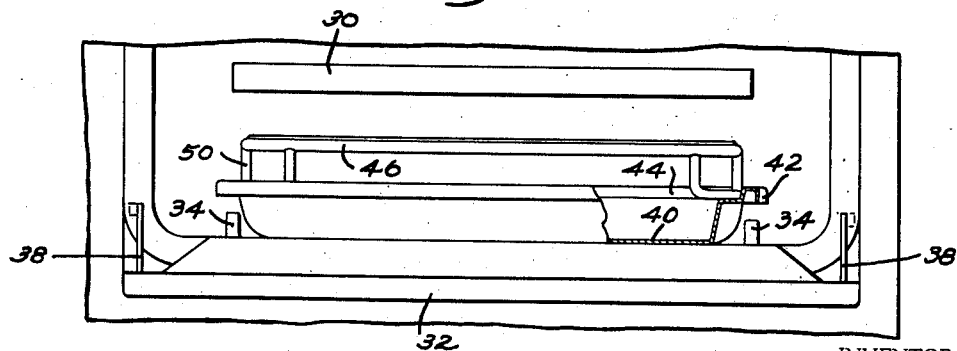
Fig. 2 is a fragmentary front view of the lower portion of the oven with the door open.

Referring now to the drawings, and more particularly to Fig. 1, there is shown an insulated oven having an outer metal wall 20, an inner metal wall 22, and heat insulation 24 in between the metal inner and outer walls. The metal inner wall 22 extends around the top, bottom, back and side walls and upon the bottom it forms the floor of the oven which is provided with guide-ways 26 for guiding the broiling pan 28 into and out of position beneath the heating element 30 which is used for broiling purposes which is located with its bottom surface about 4¼" or 4½" above the floor of the oven. The oven is provided with an insulated door 32 having a metal lined inner face. The oven door is supported by a piano-type hinge located in such a manner that when fully opened, its inner face is directly on the same level and in alignment with the floor of the oven. The inner face of the door is also provided with guides 34 which are in alignment with the guides 26 upon the floor of the oven when the door is fully opened. The amount of opening of the door is limited by the door checks 36 which stop the door when its inner face becomes level with the floor of the oven.

The broiling pan 28 which rests between the guideways 26 upon the floor of the oven is stamped out of a single sheet of metal and is generally rectangular in shape. It has a depressed portion 40 for catching grease and meat juices and a reinforced rim 42 which is provided with ledges 44 at the four corners of the pan for supporting a broiling rack. The broiling rack is formed first of a heavy metal rod 46 which is bent into the shape of a rectangular loop. It is also provided with a center rod which extends from one side of the rectangular loop to another and is welded thereto at these points. Over this loop and center rod are located closely spaced bars 48. These bars are welded to the loop and the bars are spaced very closely so that they protect the bottom of the pan from the radiant heat emitted by the heating element 30. In times past, difficulty has been encountered where widely spaced thin rods have been used as a broiling rack. With such a construction, the radiant heat from the heating element during broiling overheats and causes excessive and highly undesirable smoking of the grease caught in the broiling pan. By providing the closely spaced metal bars 48, the greater portion of this heat is blocked out by the bars so that the heating of the grease is greatly diminished and a great portion of the smoking of the grease is prevented. The rack is provided with supports 50 at the four corners. These supports are made of wire rod in a sort of a U-shaped form having the upward extending legs of the U welded to the corners of the loop of metal rod 46 forming the main frame member of the rack. These supports 50 are not the true U-shape, but are bent laterally at substantially the same radius as is provided for the corners of the loop 46.

Figure 3:
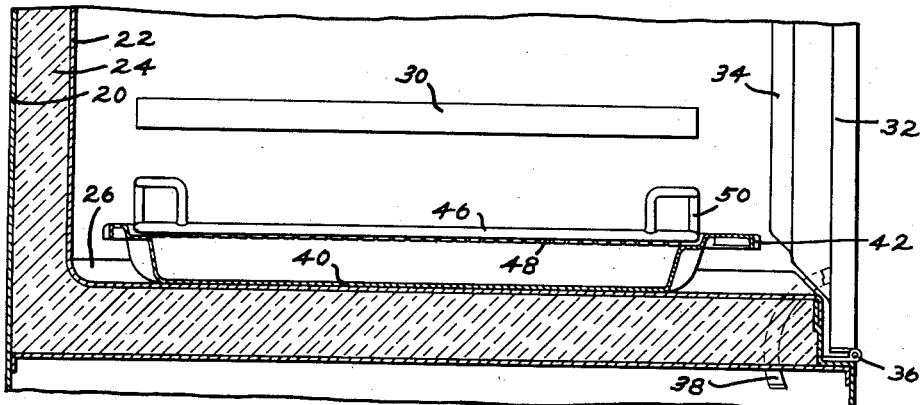
Fig. 3 is a vertical sectional view through the oven and a portion of the broiling pan showing the broiling rack in its lower position.
Figure 4:
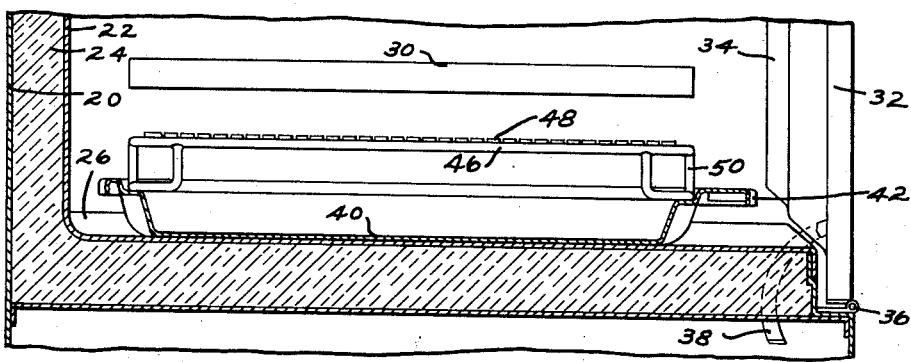
Fig. 4 is a vertical sectional view through a portion of the oven and the broiling pan showing the broiling rack in its upper position.
Figure 5:
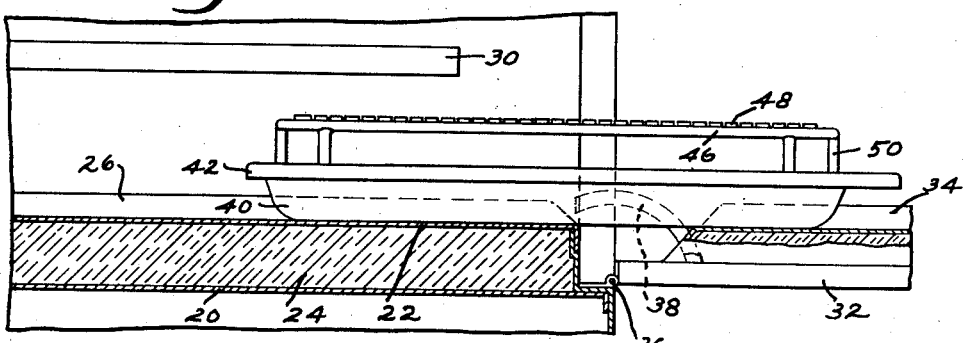
Fig. 5 is a vertical sectional view through the oven and a portion of the door showing the broiling pan resting partially upon the floor of the oven and partially upon the inner face of the door.

The bottom portions of these supports rest upon the ledges provided at the four corners of the pan when the rack is in its upright position, as shown in Figs. 1, 2, 4 and 5. This places the top surface of the rack up within about 1¼" of the heating element 30, which distance is suitable for toasting, broiling bacon and thin steaks. The rack, however, may be inverted, that is, turned upside down, as in Fig. 3, so that the rectangular loop 46 and some of the bars 48 rest upon the ledges provided at the corners of the broiling pan. This brings the surface of the broiling rack just above the surface of the ledges provided at the corners of the broiling pan and makes the distance between the surface of the rack and the bottom of the heating element about 3". This is suitable for broiling thick steaks, fish and chicken. By this arrangement, it is possible to pull out the broiling pan from a position beneath the heating element without any danger of spilling the grease or juice regardless of the position of the surface of the rack with relation to the heating element.

While the form of embodiment of the present invention as herein disclosed, constitutes a preferred form, it is to be understood that other forms might be adopted, all coming within the scope of the claims.

What is claimed is as follows:

1. A broiler pan having a bottom and side walls, said side walls being provided below their top with ledge means, a substantially flat grid member having its grid portion resting directly upon the ledge means, said grid member being provided with supports extending directly upwardly from said member resting upon the ledge means for supporting the grid portion above the ledge means when the grid member is inverted, said side walls being provided with means for preventing lateral shifting of the grid member.

2. A square broiler pan having a bottom and side walls, said side walls being provided below their top with ledge means at the corners of the pan, a substantially flat grid member having its grid portion resting directly upon the ledge means, said grid member being provided with supports in the form of loops of heavy wire extending directly upwardly from the corner portions of said grid member resting upon the ledge means, said supports being provided for supporting the grid portion above the ledge means when the grid member is inverted.

FRANCIS H. McCORMICK.